United States Patent
Farley

(10) Patent No.: US 7,363,840 B1
(45) Date of Patent: Apr. 29, 2008

(54) RETAINING DEVICE WITH HIGH MODULUS POLYMER INSERT AND SOCKET WEAR INDICATOR

(76) Inventor: D. Gray Farley, 19205 Woodlands Ln., Huntington Beach, CA (US) 92648

(*) Notice: Subject to any disclaimer, the term of this patent is extended or adjusted under 35 U.S.C. 154(b) by 0 days.

(21) Appl. No.: 11/610,408

(22) Filed: Dec. 13, 2006

(51) Int. Cl.
*B25B 23/16* (2006.01)
*B25G 1/00* (2006.01)
*B25G 3/18* (2006.01)
*B25G 3/00* (2006.01)
*F16B 21/00* (2006.01)
*F16B 7/00* (2006.01)
*F16D 1/00* (2006.01)

(52) U.S. Cl. ............... 81/177.85; 403/324; 403/379.2
(58) Field of Classification Search ............ 81/177.85, 81/121.1; 403/324, 378, 379.2, 379.5, 408.1, 403/298, 108; 279/97; 411/364, 365, 517
See application file for complete search history.

(56) References Cited

U.S. PATENT DOCUMENTS

| | | | |
|---|---|---|---|
| 1,265,341 A | | 5/1918 | Keller |
| 2,110,397 A | | 3/1938 | Kangas |
| 2,304,038 A | | 12/1942 | Thompson |
| 2,464,381 A | * | 3/1949 | Donaldson et al. ...... 403/379.4 |
| 2,837,381 A | | 6/1958 | Sarlandt |
| 3,549,160 A | * | 12/1970 | Etzkorn ...................... 279/97 |
| 4,266,453 A | * | 5/1981 | Farley ..................... 81/177.85 |
| 4,304,500 A | * | 12/1981 | Faulk ......................... 403/324 |
| 4,477,096 A | * | 10/1984 | Wallace et al. ............... 279/97 |
| 4,583,430 A | * | 4/1986 | Farley ..................... 81/177.85 |
| 4,627,761 A | * | 12/1986 | Olson et al. ............... 403/324 |
| 4,932,293 A | | 6/1990 | Golff |
| 6,076,436 A | * | 6/2000 | Farley ..................... 81/177.85 |
| 2004/0237730 A1 | * | 12/2004 | Hirakata ................. 81/177.85 |

* cited by examiner

*Primary Examiner*—Joseph J. Hail, III
*Assistant Examiner*—Bryan R. Muller
(74) *Attorney, Agent, or Firm*—Myers Dawes Andras & Sherman LLP; Joseph C. Andras

(57) ABSTRACT

A retaining device to secure a socket to an anvil including an O-ring, an integral projection extending inwardly from the O-ring, and an insert secured at or near a far end of the integral projection. The insert may be made from a non-metallic high modulus material that can compress up to 50% of its original diameter without breaking. The insert may also include a socket wear indicator that consists, for example, of a raised ridge located within a recess on the side of the insert. The raised ridge, if crushed at the juxtaposition between the socket and the anvil, provide an early indication that the socket's drive aperture is worn and that the socket should be replaced.

12 Claims, 6 Drawing Sheets

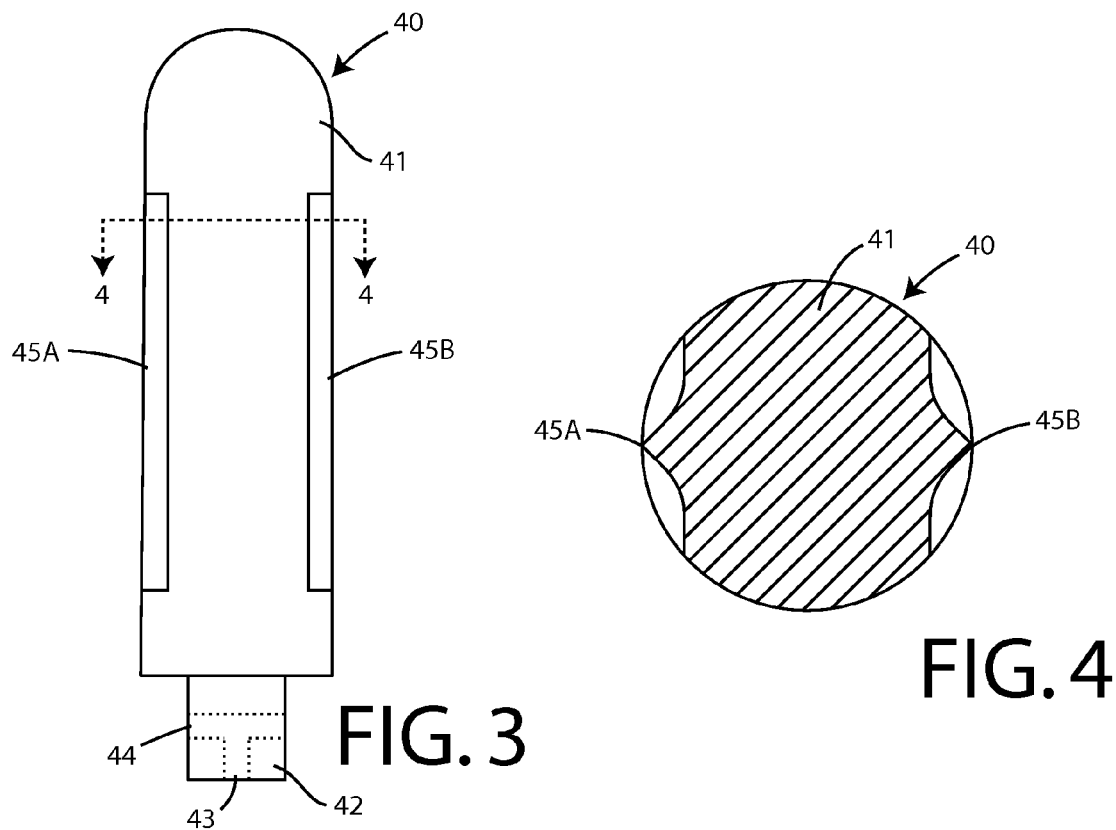
FIG. 3
FIG. 4
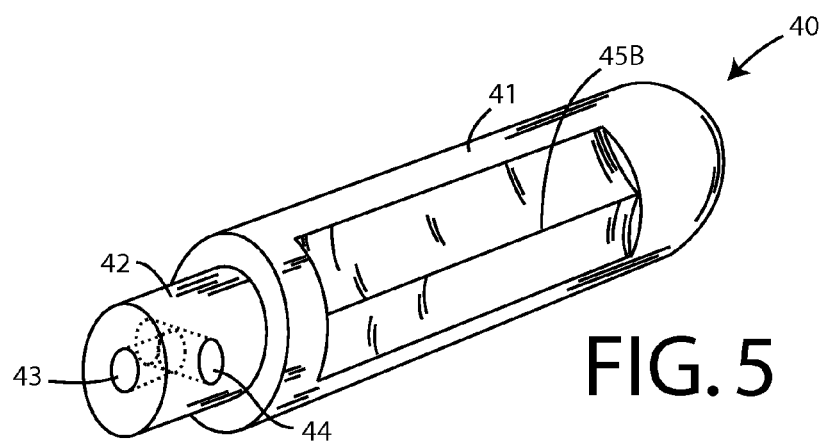
FIG. 5

RETAINING DEVICE WITH HIGH MODULUS POLYMER INSERT AND SOCKET WEAR INDICATOR

FIELD OF THE INVENTION

This invention relates generally to the field of retaining devices adapted for securing sockets to the anvils of a large pneumatic air gun or other power drive and, more particularly, to a retaining device with high modulus polymer insert and a socket wear indicator.

BACKGROUND OF THE INVENTION

Over the years, various retaining devices have been developed for safely securing power driven sockets to the rotating anvils of pneumatic air guns or power drives. I have received three patents in this area including U.S. Pat. No. 4,266,453 which issued in 1981 and is entitled "Socket Retaining Ring" (the "1981 patent"), U.S. Pat. No. 4,583,430 which issued in 1986 and is entitled "Metal Shielded Retaining Ring" (the "1986 patent"), and U.S. Pat. No. 6,076,436 which issued in 2000 and is entitled "Retaining Device With Metal Insert" (the "2000 patent"). The disclosures of my foregoing patents are hereby incorporated by reference as if fully set forth herein.

Prior to the 1981 patent, power driven sockets were usually secured to the anvil of a power drive using a metal pin inserted through the bores of the socket aligned with the through-hole of the anvil. In an effort to keep the pin in place, a rubber O-ring was then installed around the periphery of the socket within an annular groove intersecting and covering the aligned bores.

The most dangerous aspect of this prior art was that workmen would often use the large impact tools by only inserting the pin without using the O-ring. Since the O-ring was separate from the pin, the O-ring could easily get lost, neglected or forgotten. Injury could occur during use when the metal pins were violently dislodged by centrifugal force as a result of a defective O-ring or the lack of the O-ring.

In addition, normal usage of the tool would cause wear and tear of the inner surface of the socket, causing the socket to fit less tightly onto the square end of the anvil. During operation, the worn-out socket would rotate relative to the anvil, creating a "scissors-like" action. This "scissors-like" movement applied a shearing force at two places between the inner surface of the socket and the anvil: 1) the first juxtaposition defined by the alignment of the first bore of the socket with the first end of the through-hole of the anvil; and 2) the second juxtaposition defined by the alignment of the second bore of the socket with the second end of the through-hole of the anvil. This shearing force occasionally caused the metal pin to be jammed in the bores of the socket, creating a major inconvenience as workers would have to drill out the lodged metal pins.

The 1981 patent sought to remedy these problems by providing the O-ring and pin as a single, integral piece made of an elastomeric material, e.g. polyurethane. FIG. 1 is a cutaway perspective view of a power drive 5 having an anvil 80. As further shown in FIG. 1, a socket 90 is secured to the anvil with an integral retaining ring 7 as disclosed in the 1981 patent is used to secure the socket 90 to the anvil 80.

The integral unit of the 1981 patent solved the problems caused by separate pieces. As a single unit, a worker could not use the pin without the O-ring, nor the O-ring without the pin. Furthermore, since the pin consisted of the same elastomeric material as the O-ring, workers no longer had to struggle with removing metal pins that were jammed within the bores of the anvil or socket.

However, due to ordinary wear and tear of the socket's drive hole, rotational movement of the socket 90 relative to the anvil 80 would still eventually occur as a part of normal use. The socket's drive hole tends to deform over time because the socket is usually made softer than the anvil so that the tool's life is extended. This rotational movement would occasionally result in the shearing of the retaining ring's elastomeric pin at the two juxtapositions between the anvil 80 and the socket 90.

The 1986 patent improved upon the 1981 patent by encapsulating a metal sleeve into a far a portion of the elastomeric pin. The 1986 patent teaches placing a metal sleeve at a far end of the pin adjacent to the second juxtaposition, which is the juxtaposition furthest away from the base of the pin. Using the metal sleeve improved the safety of the completely polyurethane retaining device disclosed in the 1981 patent. However, since the metal sleeve was hollow, it sometimes could not withstand an especially strong shearing force. In such case, the shearing force could crush or shatter the metal sleeve, destroying the safety of the ring as well as making it very difficult to remove.

The encapsulated steel sleeve of the 1986 patent included an axial through hole so that it was captured between the pin's base and the pin's far end. This was necessary because the steel insert was subjected to a fair amount of centrifugal force due to its relatively great mass being located off axis and thereby being rotated around the axis of the drive's anvil.

The encapsulated steel sleeve of the 1986 patent provided enhanced safety for the operator, but it often became crushed at the far juxtaposition between the anvil 80 and the socket 90 and the operator had to drill it out to remove the socket 90.

The 2000 patent sought to improve on the 1981 and 1986 patents by providing a short pin comprised of an elastomeric base and a steel pin. Unlike the retaining rings that came before it, the steel pin of the retaining ring disclosed in the 2000 patent only extended into the near juxtaposition between the socket 90 and the anvil 80. The short pin device was easier to install, but it did not do well in the marketplace because the operators continued to prefer retaining rings with long pins that passed through both juxtapositions. Moreover, when used with worn sockets, the steel pin of the short pin device fragmented within the juxtaposition and needed to be drilled out.

Being subject to corrosion, the steel pins of the prior devices required additional expense to provide corrosion resistance through heat treating, or plating, or both.

Finally, because the sockets secured by the prior art pins are generally manufactured from a softer steel than the anvil, the interior of the socket's drive aperture can become oversized relative to the anvil's exterior. In such case, the resulting slop may permit the socket to twist somewhat relative to the anvil, thereby shearing the pin, regardless of whether the pin is elastomeric or steel. The worn socket, now free to spin off axis as well, can be thrown at high speed and result in an unfortunate injury to the operator or nearby co-workers. The prior art retaining rings have done little to provide the operator with a definitive visual indication of the socket's suitability for continued use.

There remains a need, therefore, for a long-pin retaining device that eliminates the need for a through hole, that reduces if not eliminates the need to drill out a metal pin in order to remove the socket from the anvil, that does not require expensive corrosion resistance processing, and that provides definitive visual feedback on the socket's suitability for continued use. There also remains a need for a holding pin that does not fail, when crushed, if the operator continues to use a worn socket.

BRIEF SUMMARY OF THE INVENTION

It is an object of the invention to hold a socket on the square drive or anvil of an impact wrench.

It is a further object of the present invention to provide a wear indicator that indicates excessive wear on sockets.

It is a further object of the present invention to indicate when the socket is too worn for continued use.

It is a further object of the present invention to indicate that the socket is worn in a clear and definitive manner.

It is a further object of the present invention to provide a retaining device that does not fail when compressed owing to the use of a worn socket.

In a first aspect, the invention may be regarded as a one-piece retaining ring that is adapted for securing a socket to an anvil having a transverse through-hole, the socket having a drive aperture, an annular groove about its periphery and a cross-bore that aligns with the anvil's transverse through-hole when the anvil is inserted into the socket's drive aperture, comprising an O-ring; a projection formed integrally with and extending inwardly from the O-ring; an insert; means for securing the insert at or near an end of the projection; and a socket wear indicator that is located on a side of the insert and is positioned within the juxtaposition between the socket's cross-bore and the anvil's transverse through-hole to present a crush mark that visually indicates when the socket's drive aperture is worn to the point that the socket fits loosely on the anvil and should be replaced.

In a second aspect, the invention may be regarded as a one-piece retaining device that is adapted for securing a socket to an anvil having a transverse through-hole, the socket having a drive aperture, an annular groove about its periphery and a cross-bore that aligns with the anvil's transverse through-hole when the anvil is inserted into the socket's drive aperture, comprising an O-ring; a projection formed integrally with and extending inwardly from the O-ring; a non-metallic insert; and means for securing the non-metallic insert at or near an end of the projection.

The just summarized invention may be better understood by reviewing the preferred embodiment disclosed in the following description and related drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below or illustrated in the figures, of which:

FIG. 3 is a close-up elevational view of the insert 40 used in the first preferred embodiment of FIG. 2;

FIG. 4 is a cross-sectional view of the insert 40 of FIG. 3, taken along section lines 4-4, showing raised ridges with substantially triangular profiles having a sharp, outermost edges 45A, 45B;

FIG. 5 is a perspective view of the insert 40 of FIG. 3;

DETAILED DESCRIPTION OF THE PREFERRED EMBODIMENT

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

Figure 1:
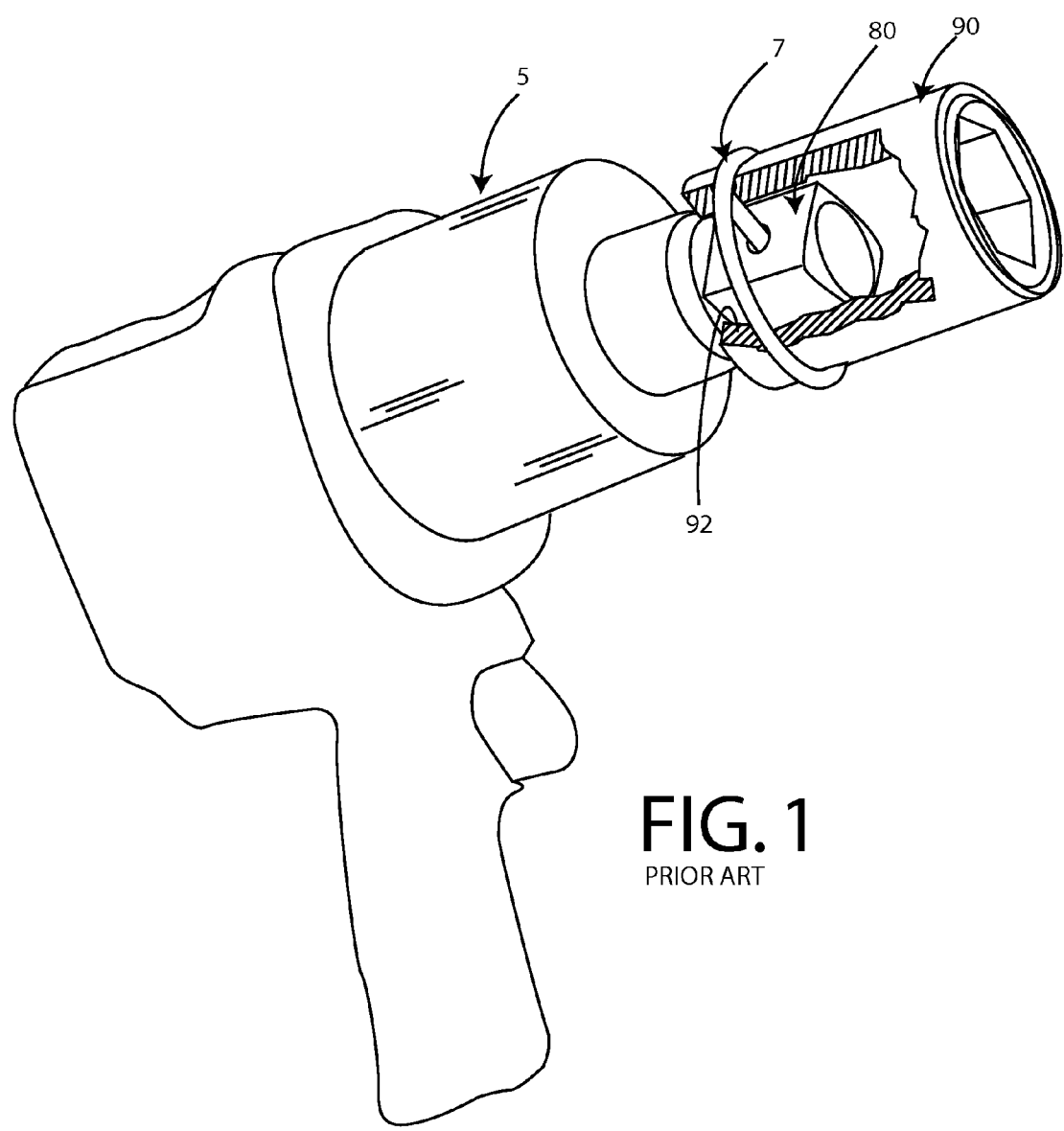
FIG. 1 is a cutaway perspective view of a socket 90 secured to the anvil 80 of a pneumatic air gun or power drive 5 with a retaining ring 7.

FIG. 1 is a cutaway perspective view of a large pneumatic air gun 5, sometimes called an impact wrench or power drive, having a square drive anvil 80 (e.g. ¾", 1" and 1½" square drives). Also shown is a socket 90 having a female drive aperture 92 that is sized to closely fit over the anvil 80. Lastly, FIG. 1 shows how a prior art retaining ring 7 secures the socket 80 to the anvil 90 so that it does not fall off of the power drive 5. As explained above in the background section, the retaining ring 7 performs an important safety function. In particular, it reduces the possibility that the operator will trigger the air gun with the socket 90 only partially installed on the anvil 80. Under such unfortunate circumstances, the socket 90 would spin off of the anvil 80 at great velocity and may injure nearby persons or damage property.

Figure 2:
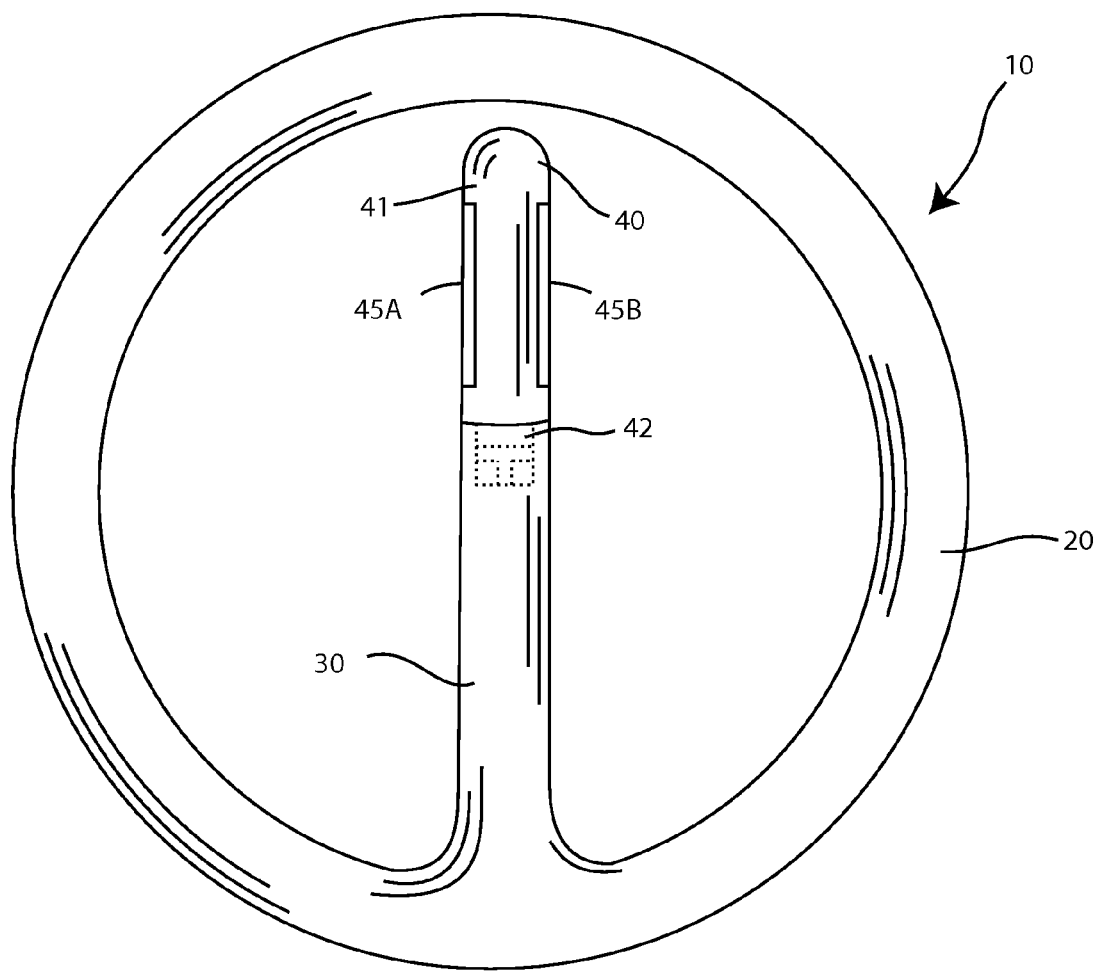
FIG. 2 is an elevational view of a retaining device having an insert 40 according to a first preferred embodiment of the present invention.

FIG. 2 is an elevational view a retaining device 10 having a unique insert 40 according to a first preferred embodiment of the present invention. As shown, the first preferred retaining device 10 includes an O-ring 20 having an integral projection 30, and the insert 40 which includes a body 41 and a retention stub 42. In the preferred embodiment, the O-ring 20 and its integral projection 30 are formed from an injection molded elastomer such as polyurethane. The preferred polyurethane for injection molding the O-ring 20 and integral projection 30 is TEXIN® 285, a polyester-based thermoplastic polyurethane manufactured by Bayer MaterialScience LLC.

Steel pins, generally speaking, do not have the ability to compress without failure. Unlike the known prior art, the far-side insert 40 is not made of steel or other metal (which may become pinched between the anvil 80 and a socket 90, especially when used with a worn drive aperture 92), but rather is uniquely formed from a high modulus polymer material, or resin, which can be crushed by a significant amount (e.g. as much as 40-50%) while still maintaining some headroom for its socket holding function. Modulus is the ability to resist stretching or compression. The use of a suitable high modulus material will allow the insert 40 to compress up to 50% of its original diameter (while maintaining its tensile strength and holding ability) without breaking. The preferred material is TEXIN® 270, a polyester-based thermoplastic polyurethane which the inventor understands to be a polyurethane combined with a resin and which can be purchased from distributors for Bayer MaterialScience LLC.

As shown in FIGS. 2 and 3, a preferred means for securing the resin insert 40 to the polyurethane projection 30 is by way of a retention stub 42 that includes a plurality of fillable apertures, including an axial aperture 43 and a cross aperture 44. During an injection molding operation, the polyurethane surrounds the retention stub 42 and spills in to the apertures 43, 44, thereby securing the insert 50 to the end of the projection 30. This is merely the preferred way of joining the projection 30 to the insert 40. The means for securing may be provided with any other physical bonding arrangement, such as a sleeve-shaped insert which is physically secured near the end of the projection 30 with polyurethane extending through the insert.

As shown in FIGS. 2-5, the resin insert 40 of the first preferred retaining ring 10 includes a crush gauge, or indicator gauge, formed from a raised ridge 45A, 45B on its rotationally facing sides. It may be possible to have only one indicator gauge, but two are preferred since the drive 5 may be used in both directions, and since the retaining ring 10 may be installed with either side facing upward. The raised ridges 45A, 45B forming the preferred crush gauge extend outward from the body 41 within a recessed area (not separately numbered). This is preferred because, generally speaking, the recessed area will not be pinched unless the socket 90 has developed a rounded drive hole 92 through extensive use.

Figure 6:
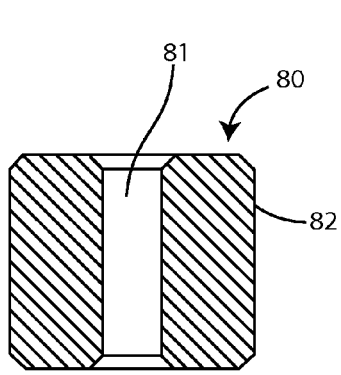
FIG. 6 is a cross-sectional view of an anvil like that shown in FIG. 1.
Figure 7:
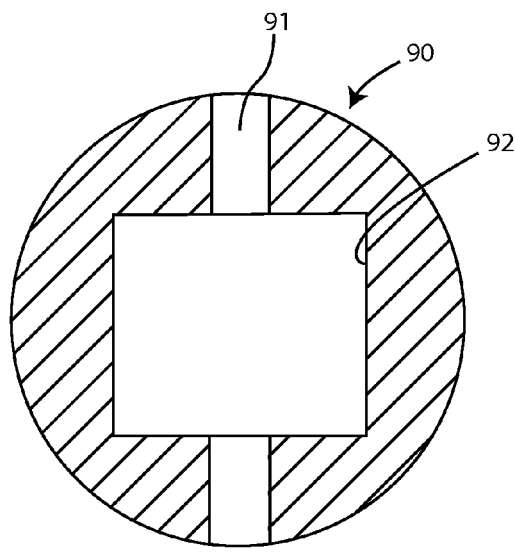
FIG. 7 is a cross-sectional view of the base of a socket 90 like that shown in FIG. 1.
Figure 8:
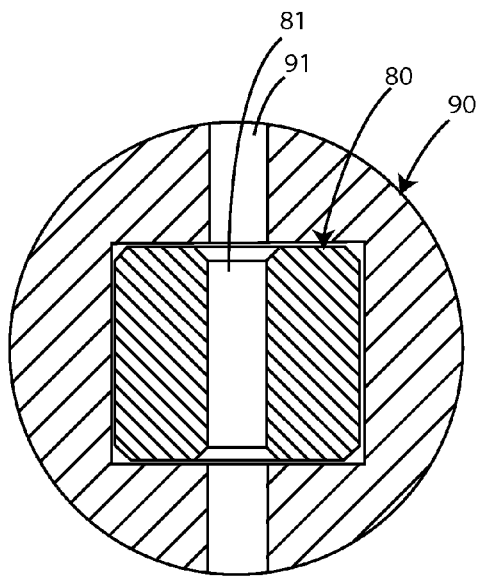
FIG. 8 is a cross-sectional view of the socket 90 of FIG. 7 installed on the anvil 80 of FIG. 6.

FIGS. 6-9 illustrate the construction and interaction of the anvil 80, socket 90, and retaining ring 10 during use. As shown in FIG. 6, the anvil 80 includes a transverse through hole 81 and an outer square surface 82. And, as shown in FIG. 7, the socket 90 includes a transverse through hole 91 and an inner, or female, drive aperture 92. FIG. 8 shows how the socket's square drive aperture 92 is sized to closely fit the anvil's square periphery 82 in order to provide an efficient transfer of torque from anvil 80 to socket 90. Note that the socket's through hole 91 is aligned with the anvil's through hole 81 when the socket 90 is installed on the anvil 80 as shown in FIG. 1.

Figure 9:
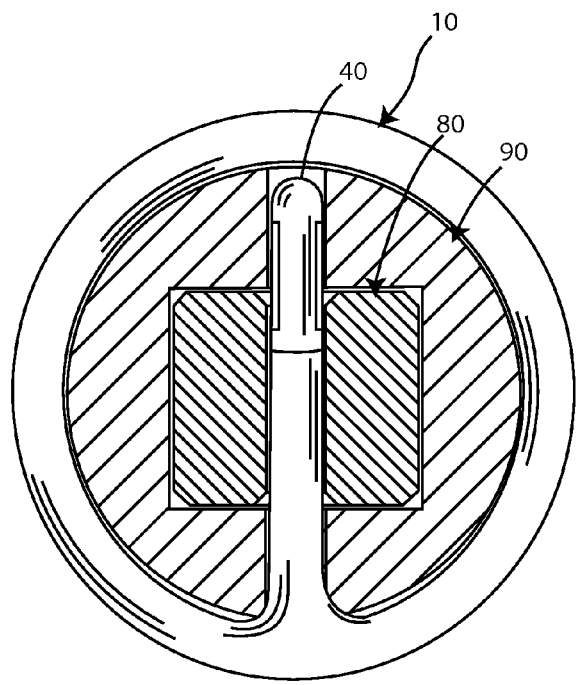
FIG. 9 is a cross-sectional view like FIG. 8, but further including the first preferred retaining device of FIG. 2 installed through the socket 90 and anvil 80.

FIG. 9, finally, shows the retaining ring 10 installed through the aligned through holes 91, 81. Note that the high modulus resin insert 40 is slid all the way to the far side where it is located at a far juxtaposition between the anvil 80 and the socket 90. At this location, the insert 40 prevents the socket 90 from falling off of the anvil 80. The insert 40 is not intended to absorb the rotational forces when operating the air tool 5 (see FIG. 1). Rather, the square periphery 82 of the tool's male anvil 80 is designed to fit snugly into the female drive aperture 92 of the socket 90.

However, if the socket's drive aperture 92 becomes worn and rounded on the square drive 80 after repeated use, the anvil 80 will rotate within the socket 90 and the misaligned through holes 81, 91 will pinch the insert 40. If the retaining ring includes a steel pin as was disclosed in the 1986 patent, this could eventually lead to the destruction of the pin and the socket 90 could fly off of the spinning anvil 80. The preferred insert 40 of the present invention is uniquely structured to alert the operator of a socket 90 that is becoming worn and should be replaced, while still holding the socket until an inspection of the retaining ring is performed.

Figure 10:
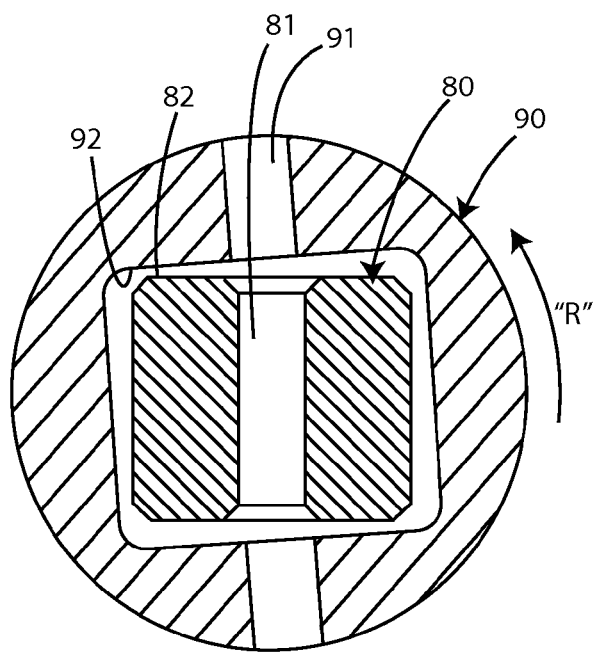
FIG. 10 is a cross-sectional view that is similar to FIG. 8, but showing the socket 90 having an enlarged drive hole 92 from wear and tear (exaggerated for clarity) installed about the periphery 82 of the anvil 80 of FIG. 6.
Figure 11:
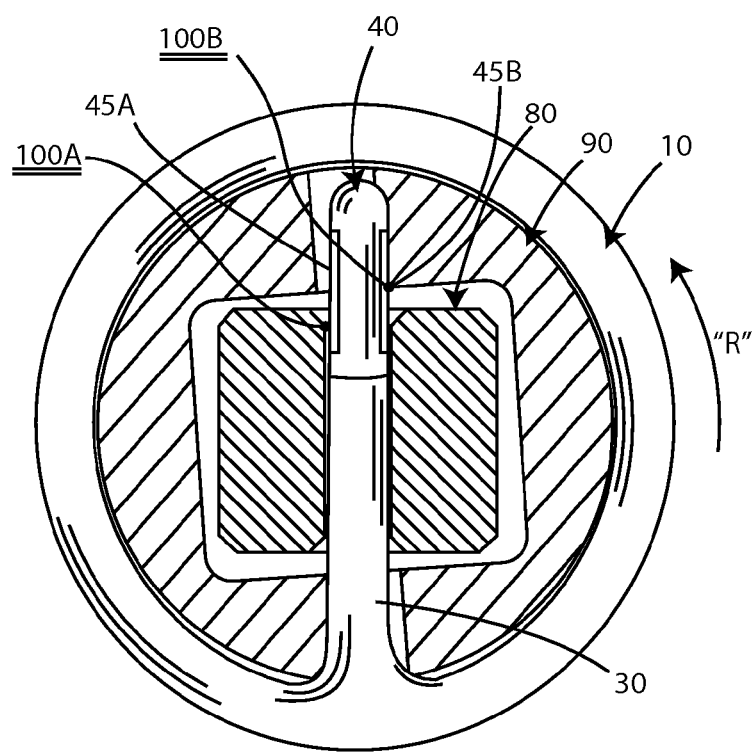
FIG. 11 is a cross-sectional view that is similar to FIG. 9 in that it includes the first preferred retaining device of FIG. 2, showing how a worn socket 90 can rotate relative to the anvil and press against a side of the retaining device's pin 40.

FIGS. 10 and 11 illustrate the relative movement of the anvil 80 and a socket 90 having a worn or rounded drive aperture 92. In particular, FIG. 10 is a cross-sectional view that is similar to FIG. 8, but showing the socket 90 having a drive hole 92 that has been enlarged from wear and tear (exaggerated for clarity) installed about the periphery 82 of the anvil 80 of FIG. 6. As suggested by arrow "R", anvil 80 may rotate within the socket 90, or conversely speaking, the socket 90 may rotate relative to the anvil 80. The result of such rotation is a misalignment of the through-holes 81, 91 and both the near and far juxtapositions or junctions (not separately numbered).

FIG. 11 is a cross-sectional view that is similar to FIG. 9, and builds on FIG. 10, in that it includes the first preferred retaining device 10 of FIG. 2, showing how a worn socket 90 can rotate relative to the anvil and press against a side of the retaining device's pin 40. Here, owing to the relative movement between the anvil 80 and the worn socket 90, the anvil 80 and socket 90 press against the raised ridges 45A, 45B functioning as a crush gauge. The anvil 80 and socket 90, more specifically, presses against the raised ridges 45A, 45B at locations 10A, 10B.

Figure 12:
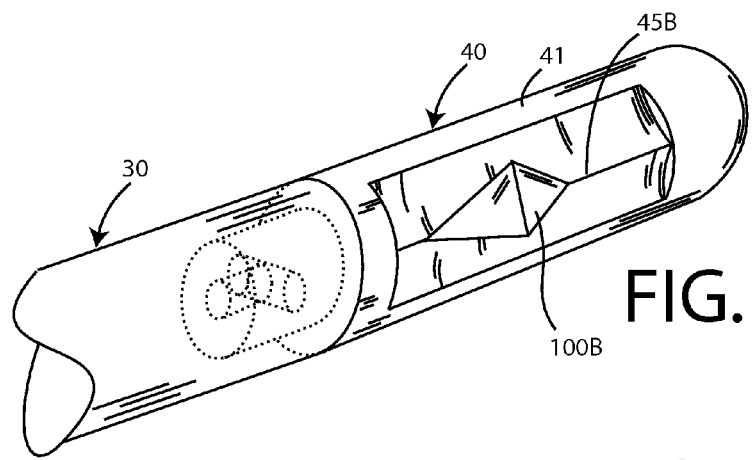
FIG. 12 is a perspective view of the first preferred pin 40 of the retaining device of FIG. 2, illustrating how the movement of a worn or sloppy socket 90 that moves relative to the anvil 80 (see FIGS. 10 and 11) will form compression marks 100A, 100B on both its raised ridges 45A, 45B to visually alert the operator to replace the socket.

FIG. 12 show the insert 40 after a worn socket 90 created a crush mark 100B in one of its raised ridges 45B. This crush mark 100B is intended to alert the operator that the socket 90 is worn and should be replaced at once. This is a significant improvement over the existing retaining rings which hold the socket on the anvil until failure at the steel pin occurs, but do not provide the operator with any basis for determining when the socket 90 is worn out.

Figure 13:
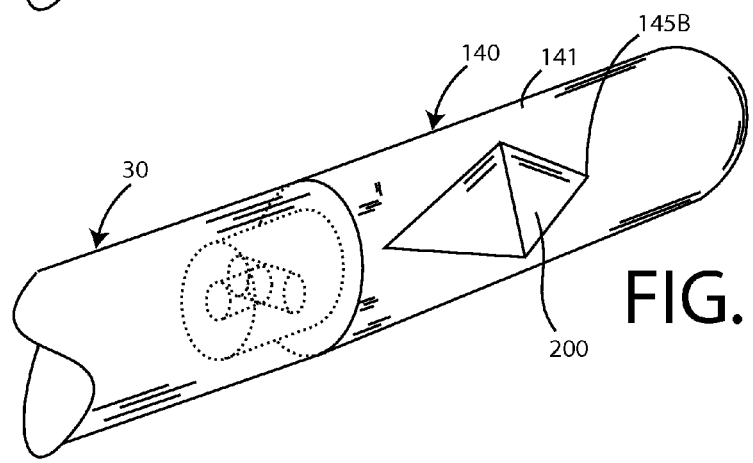
FIG. 13 is a perspective view of an alternative pin 140 which does not have a raised ridge recessed in its side can nonetheless present a compression mark 200 to the operator when a worn or sloppy socket 90 that moves relative to the anvil 80 (see FIGS. 10 and 11)

FIG. 13 is a perspective view of an alternative pin 140 with a body 141 which simply has a side 145B and does not have a raised ridge extending from its side, or recessed in its side, but can nonetheless present a compression mark 200 to the operator when a worn or sloppy socket 90 moves relative to the anvil 80 as shown in FIGS. 10 and 11.

Figure 14:
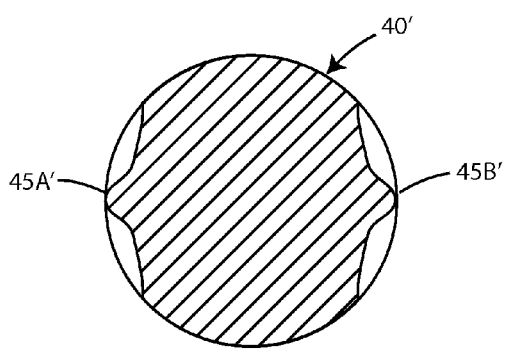
FIG. 14 is a cross-sectional view of an alternative insert 40', taken along section lines 4-4 of FIG. 3, showing raised ridges 45A', 45B' with rounded profile.
Figure 15:
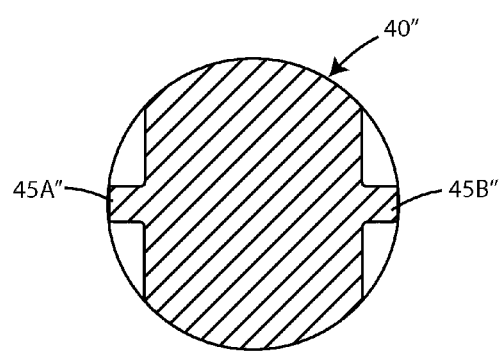
FIG. 15 is a cross-sectional view of an alternative insert 40", taken along section lines 4-4 of FIG. 3, showing raised ridges 45A", 45B" with square profile.

FIGS. 14 and 15 are cross-sectional views of alternative insert geometries having raised ridges within recessed side apertures. FIG. 14 illustrates a second preferred insert 40', taken along section lines 4-4 of FIG. 3, showing raised ridges 45A', 45B' with a rounded profile. FIG. 15 is a cross-sectional view of another alternative insert 40", taken along section lines 4-4 of FIG. 3, showing raised ridges 45A", 45B" with a square profile.

The just described embodiment is but one of many possible embodiments of the invention, which invention is described in the following claims.

I claim:

1. A one-piece retaining ring that is adapted for securing a socket to an anvil having a transverse through-hole, the socket having a drive aperture, an annular groove about its periphery and a cross-bore that aligns with the anvil's transverse through-hole when the anvil is inserted into the socket's drive aperture, comprising:
   an O-ring;
   a projection formed integrally with and extending inwardly from the O-ring;
   an insert;
   means for securing the insert at or near an end of the projection; and
   a socket wear indicator that is located on a side of the insert and is positioned within the juxtaposition between the socket's cross-bore and the anvil's transverse through-hole to present a crush mark that visually indicates when the socket's drive aperture is worn to the point that the socket fits loosely on the anvil and should be replaced, the socket wear indicator formed from a raised ridge that extends outward from a recess on the side of the insert.

2. The one-piece retaining device of claim 1 wherein the raised ridge has a substantially triangular profile to provide a sharp edge that enhances the visibility of the crush mark.

3. The one-piece retaining device of claim 1 wherein the socket wear indicator is formed from raised ridges on opposite sides of the insert.

4. The one-piece retaining device of claim 3 wherein the raised ridges extend outward from recesses on opposite sides of the insert.

5. The one-piece retaining device of claim 1 wherein the insert is made from a high modulus non-metallic material that retains its holding ability when compressed up to 50% of its original diameter.

6. The one-piece retaining device of claim 5 wherein the high modulus material comprises a polyester-based thermoplastic polyurethane.

7. A one-piece retaining device that is adapted for securing a socket to an anvil having a transverse through-hole the socket having a drive aperture, an annular groove about its periphery and a cross-bore that aligns with the anvil's transverse through-hole when the anvil is inserted into the socket's drive aperture, comprising:
   an O-ring;
   a projection formed integrally with and extending inwardly from the O-ring;
   a non-metallic insert; and
   means for securing the non-metallic insert at or near an end of the projection;
   and further comprising a socket wear indicator that is located on the side of the non-metallic insert and positioned within the juxtaposition between the socket's cross-bore and the anvil's transverse through-hole to present a crush mark that visually indicates when the socket's drive aperture is worn to the point that the socket fits loosely on the anvil and should be replaced, the socket wear indicator formed from a raised ridge that extends outward from a recess on the side of the insert.

8. The one-piece retaining device of claim 7 wherein the raised ridge has a substantially triangular profile to provide a sharp edge that enhances the visibility of the crush mark.

9. The one-piece retaining device of claim 7 wherein the socket wear indicator is formed from raised ridges on opposite sides of the non-metallic insert.

10. The one-piece retaining device of claim 9 wherein the raised ridges extend outward from recesses on opposite sides of the non-metallic insert.

11. The one-piece retaining device of claim 7 wherein the insert is made from a high modulus material that retains its holding ability when compressed up to 50% of its original diameter.

12. The one-piece retaining device of claim 11 wherein the high modulus material comprises a polyester-based thermoplastic polyurethane.

* * * * *